May 26, 1970     TERUMOTO YAMAGUCHI     3,514,364
APPARATUS FOR FORMING FILTER ELEMENTS
Filed April 29, 1968
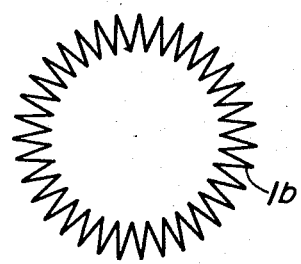
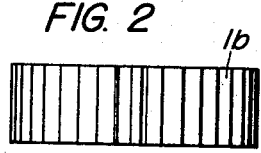
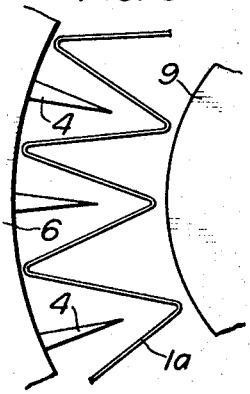
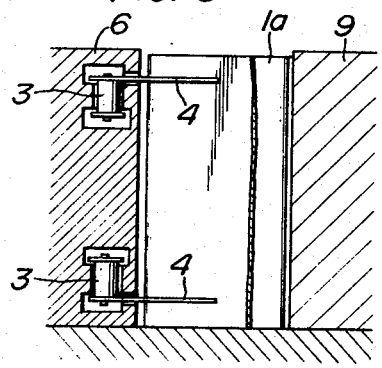
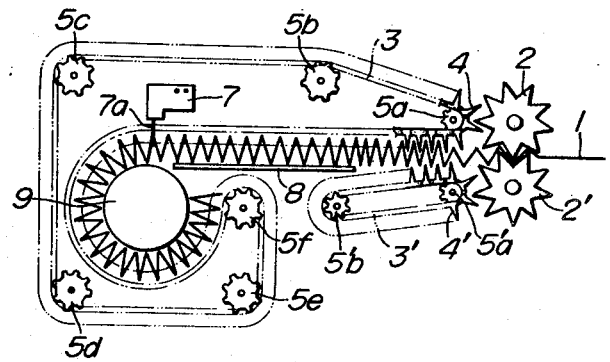
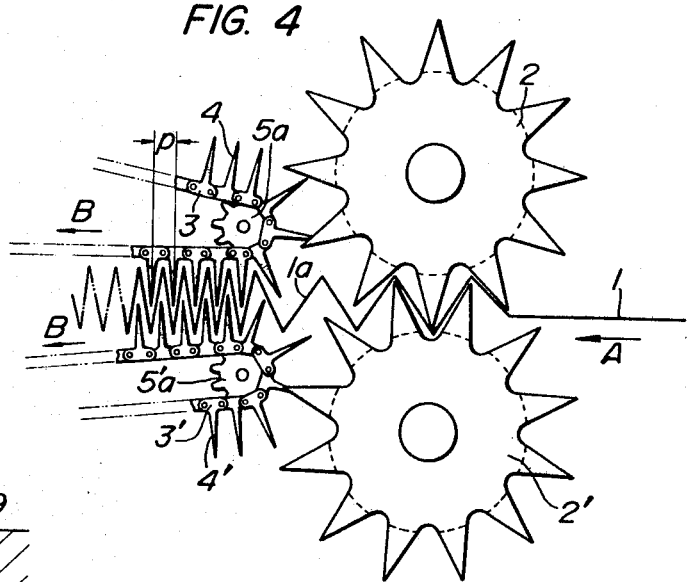
INVENTOR
TERUMOTO YAMAGUCHI
BY Cushman, Darby & Cushman
ATTORNEYS United States Patent Office 3,514,364
Patented May 26, 1970

3,514,364
APPARATUS FOR FORMING FILTER ELEMENTS
Terumoto Yamaguchi, Anjo-shi, Japan, assignor to Nippon Denso Company Limited, Kariya-shi, Japan, a corporation of Japan
Filed Apr. 29, 1968, Ser. No. 725,056
Claims priority, application Japan, Dec. 20, 1967, 42/81,766
Int. Cl. B31f 1/20, 1/26, 1/30
U.S. Cl. 156—596      4 Claims

ABSTRACT OF THE DISCLOSURE

An apparatus for forming filter elements of the kind of a ring of a corrugated band of a filtering material is disclosed, wherein the band is formed into a corrugation by being passed between a pair of intermeshing toothed wheels; the corrugated band is carried by, for example, a pair of endless chains having spikes disposed at a predetermined pitch, each spike being engaged into each fold of the corrugated band to carry the same in a regular form; and the corrugated band is formed into a desired ring element by said endless chains being moved along a contour corresponding to the outer contour of said ring element.

BACKGROUND OF THE INVENTION

The present invention relates to an apparatus for forming filter elements of a desired shape for use with filters for air, oil or the like, wherein said elements are formed by folding a band of a filtering material into a corrugation and looping it into a ring.

In a conventional apparatus for the purpose of producing such elements, a band of a filtering material is formed into a corrugation by being passed through a pair of reciprocating upper and lower forming plates which stack the band in an alternately folded manner, the formed band of a filtering material subsequently being heated in a heating furnace to permanently stabilize the corrugation. The stabilized corrugated band is then cut to a predetermined length or a predetermined number of folds and is manually inserted into a mold to be formed into a ring element as shown in FIGS. 1 and 2, wherein the pitch of the folds are adjusted by manual work.

In such a conventional method of producing the filter elements, there are disadvantages in that the process of alternately folding the band of a filtering material by a pair of reciprocating plates can only be performed in a low rate of production, and that since the folded band will recover its unfolded original shape due to its resiliency if the external restrictions are removed, the folded band must be heated in a heating furnace instantly after the folding thereof to remove said resiliency. Because of these relatively complicated processes, the cost of equipment is relatively high, and in addition, a relatively large amount of succeeding manual processes such as cutting the corrugated band to a predetermined length, forming each piece of the corrugated band in a desired contour and adjusting pitches between respective folds cause a higher cost of the products. It is also another disadvantage of such a conventional method that it is very difficult to obtain products of a high quality having a uniform shape and dimensions.

SUMMARY OF THE INVENTION

The present invention has a main object to remove the above-mentioned disadvantages in the conventional method of forming filter elements of the kind of a ring of corrugated band of a filtering material and to provide an improved apparatus for forming the same of a high quality having a uniform shape and dimensions in a high rate and low cost continuous production.

This object is attained, according to the present invention, by an apparatus for forming filter elements comprising a pair of cooperating toothed wheels adapted to be supplied with a band of a filtering material and to fold it into a corrugation, and transfer means disposed near said toothed wheels at the discharge side thereof and carrying spikes disposed at a predetermined pitch in such a manner as to guide the corrugated band in a regular form, said transfer means being moved along such a contour that said corrugated band is formed into a predetermined ring element.

Another object of the present invention is to provide a pair of parallely disposed endless chains composed of joint members, each having a spike projecting transversely from said joint member, as said transfer means of a preferable type.

Still another object is to provide sprocket wheels of a relatively small diameter near said toothed wheels at the discharge side thereof to support said endless chains so that said spikes are spread apart like a star to facilitate their engagement with said corrugated band.

Still another object is to provide a cutting device in the way of travel of said transfer means to cut said corrugated band to a predetermined length necessary to form a desired ring element.

BRIEF DESCRIPTION OF THE DRAWINGS

FIG. 1 is a plan view of a filter element to be formed by the apparatus of the present invention;
FIG. 2 is a side view of the filter element shown in FIG. 1;
FIG. 3 is a schematic view of a preferred embodiment of the apparatus for forming filter elements of the present invention;
FIG. 4 is an enlarged view of a folding zone of the apparatus shown in FIG. 3;
FIG. 5 is an enlarged view of a looping zone of the apparatus shown in FIG. 3; and
FIG. 6 is a sectional side view of the zone shown in FIG. 5.

DESCRIPTION OF THE PREFERRED EMBODIMENT

The present invention will be explained hereinafter in more details with reference to the attached drawings showing a preferred embodiment of the present invention.

FIGS. 1 and 2 show a filter element 1b of the kind of a ring of a corrugated band of a filtering material, which is itself known and was formed by the apparatus shown in FIG. 3. Although the contour of this ring element is a circle, it may be any other practical shape such as oval, square or rectangular.

Referring to FIGS. 3, 4 and 5, there is shown the apparatus for forming filter elements embodying the concept of the present invention, wherein a band of a filtering material 1 is fed into a pair of cooperating toothed wheels 2 and 2', which are rotated in counter directions and are adapted to fold the band 1 alternately into a corrugated band as designated by 1a. At the discharge side of the toothed wheels, there are provided long and short endless chains 3 and 3' close to the toothed wheels. The endless chains are carrying spikes 4 and 4' at a predetermined pitch to support the corrugated band 1a in a regular form. The endless chains 3 and 3' are in turn supported by sprocket wheels 5a, 5b, 5c, 5d, 5e and 5f and 5a' and 5b', respectively, and are driven in respective directions indicated by arrows B. The pitch P of the spikes 4 and 4' provided at the chains 3 and 3' is equal to a desired pitch of the corrugated band 1a, with which pitch said band is to be regularly formed. Each spike is formed in such a shape as to positively engage with each fold but not to damage the corrugated band.

At feed-in ends closely positioned to the toothed wheels, where the spikes and the corrugated band enter into engagement with each other, the endless chains 3 and 3' are respectively supported by the sprocket wheels 5a and 5a', each having such a relatively small diameter that the spikes, each being projected transversely from each joint member of the chain, are spread apart like a star so that the spikes can smoothly enter into engagement with the corrugated band.

A part of the long endless chain 3 is guided along a contour corresponding to the outer contour of the filter element, which is a circle in this embodiment, whereby the corrugated band is formed into the shape of the final ring element. FIGS. 5 and 6 show an embodiment of the structure for guiding the chains along said contour. As it is shown, a pair of chains 3 are supported in grooves laid along the contour in a frame member 6. The inner periphery of the corrugated band is guided on a cylindrical member 9 while it is formed into a ring.

Returning to FIG. 3, the apparatus is provided with a cutting device 7 having a cutting edge 7a. This cutting device may be of any known type operable mechanically or electrically, and is disposed in the region along the chains 3, where the looping of the corrugated band is commenced. The corrugated band is guided by a guide plate 8 on one side thereof where it is fed into the looping zone.

The apparatus of the present invention described in the above operates as follows:

The band 1 of a filtering material is fed in the direction of arrow A into the meshing region of a pair of counter rotating toothed wheels 2 and 2', where the band is alternately folded by the meshing teeth into the corrugated band 1a. Then the corrugated band is, where it has been discharged from the toothed wheels, caught by the spikes 4 and 4' of the endless chains 3 and 3' in such a manner that each spike is engaged into each fold on both sides of the corrugated band. This engagement is facilitated by the constitution that the spikes are spread apart like a star when they are to come into engagement with the corrugated band as previous explained. By means of the chains 3 and 3', the corrugated band is held in a regular form with its folds being adjusted at the pitch P of the spikes and is transferred toward the looping zone. In the looping zone, the chains 3 are guided along a contour corresponding to the outer periphery of the final ring element or a circle in the present embodiment, whereby the corrugated band, being carried by the spikes within the space between the chains 3 and the cylindrical wall 9, is formed into a ring. Just before the leading end of the corrugated band comes again to the start point of the looping, the cutting device 7 is actuated and severs the looped portion of the corrugated band from the succeeding straight portion thereof. Immediately after the cutting, the loop having a narrow gap is pushed out of the chains by a device (not shown) and is transferred into a device (not shown), in which the corrugated band expands due to its resiliency so as to close said gap and be a complete loop and is finished to a ring element.

Since, in the present invention, the folding of the band of a filtering material is performed by a pair of intermeshing toothed wheels, the folding can be performed continuously at a very high speed. Since the corrugated band is carried by the chains having the spikes, each being engaged with each fold, from the discharge side of the toothed wheels through the looping zone, the folds of the corrugated band are positively kept in a regular form and in that condition the band is continuously formed into a ring element also at a very high speed. Because of such a constitution that the endless chains composed of the joint elements, each having the spike transversely projecting therefrom, are turned around the sprocket wheels of a relatively small diameter at positions near the toothed wheels at the discharged side thereof, the spikes are spread like a star and positvely enter into engagement with the folds without damaging the material of the corrugated band. Since the corrugated band is formed into a ring element by being carried by the flexible chains, a ring element of any desired contour such as a circle, oval, square, etc. can be easily obtained. Since the corrugated band is cut in the regularly supported condition, the final ring elements have a constant number of folds. Finally, since the corrugated band which has been formed into a loop having a gap is transferred, as it is, into a device, in which it expands due to its resiliency so as to close the gap and be a complete loop and is finished to a ring element, the resiliency of the band material is positively utilized and there is no necessity of a heating furnace for removing the resiliency of the corrugated band material after the folding thereof.

What is claimed is:

1. An apparatus for forming filter elements comprising a plurality of cooperating toothed wheels adapted to be supplied with a band of filtering material so that said band of filtering material is folded into a corrugated band, transfer means adapted to receive said corrugated band at a discharge side of said toothed wheels with said corrugated band being formed into cylindrical elements having predetermined outer and inner contours and folds extending in an axial direction thereof, said transfer means comprising at least one substantially parallel arranged endless chain comprised of joint members, each of said joint members having a spike projecting transversely therefrom and guided at least a portion thereof by cam groove means along a curved passage with said spikes being directed to the concave side of said curved passage so that said corrugated band is formed into a cylindrical element by being restrictively surrounded by a portion of the said endless chain.

2. An apparatus according to claim 1, wherein said transfer means further include an auxiliary endless chain, said auxiliary endless chain being so disposed near said toothed wheels at the discharge side thereof as to cooperate with said endless chains for guiding said corrugated band.

3. An apparatus according to claim 1, wherein said endless chains are turned around sprocket wheels of a relatively small diameter disposed near said toothed wheels at said discharge side so that said spikes are spread like a start to facilitate their engagement with said corrugated band.

4. An apparatus according to claim 1, wherein a cutting device is provided in the way of travel of said endless chains to cut said corrugated band to a predetermined length necessary to form said cylindrical element.

References Cited

UNITED STATES PATENTS

| | | | |
|---|---|---|---|
| 1,245,450 | 11/1917 | Ford | 156—595 |
| 1,769,950 | 7/1930 | Hensley | 156—207 |
| 3,077,148 | 2/1963 | Mumby | 156—595 |

BENJAMIN A. BORCHELT, Primary Examiner

C. T. JORDAN, Assistant Examiner

U.S. Cl. X.R.

156—585, 589